May 14, 1963 J. V. WATSON 3,089,550
EXCAVATING OR DRILLING DEVICE
Filed May 8, 1959 7 Sheets-Sheet 3
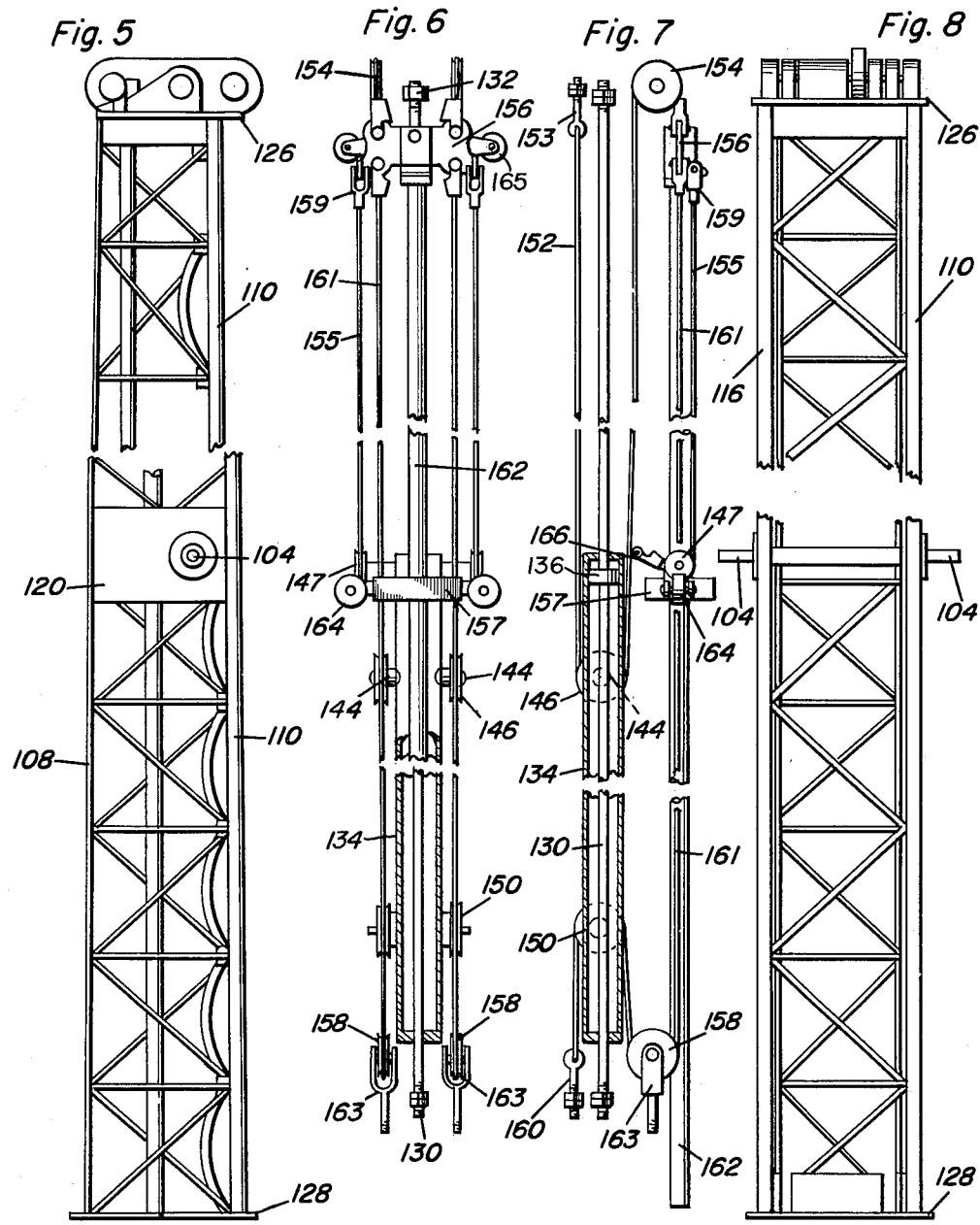
John V. Watson
INVENTOR May 14, 1963   J. V. WATSON   3,089,550
EXCAVATING OR DRILLING DEVICE
Filed May 8, 1959   7 Sheets-Sheet 4

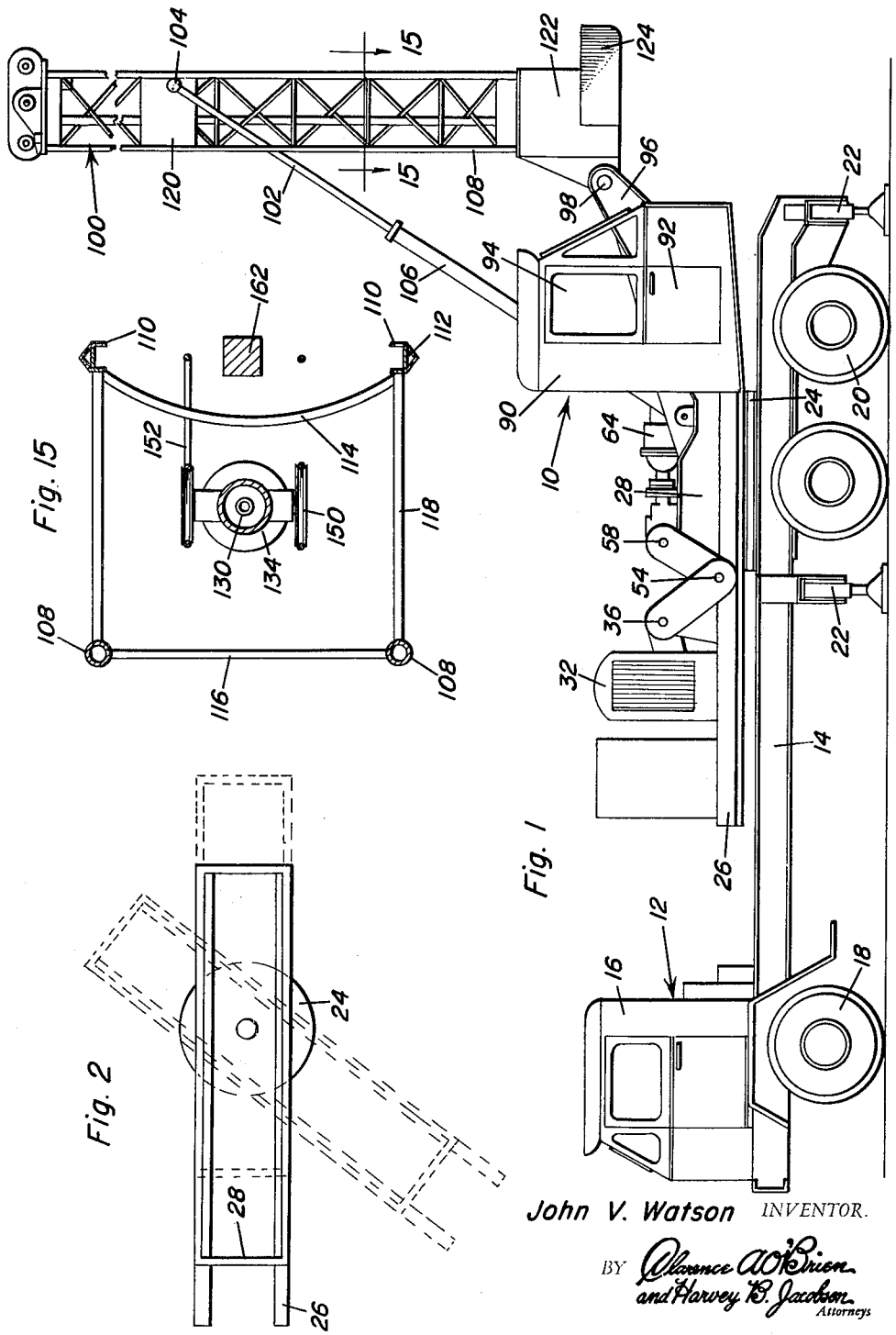

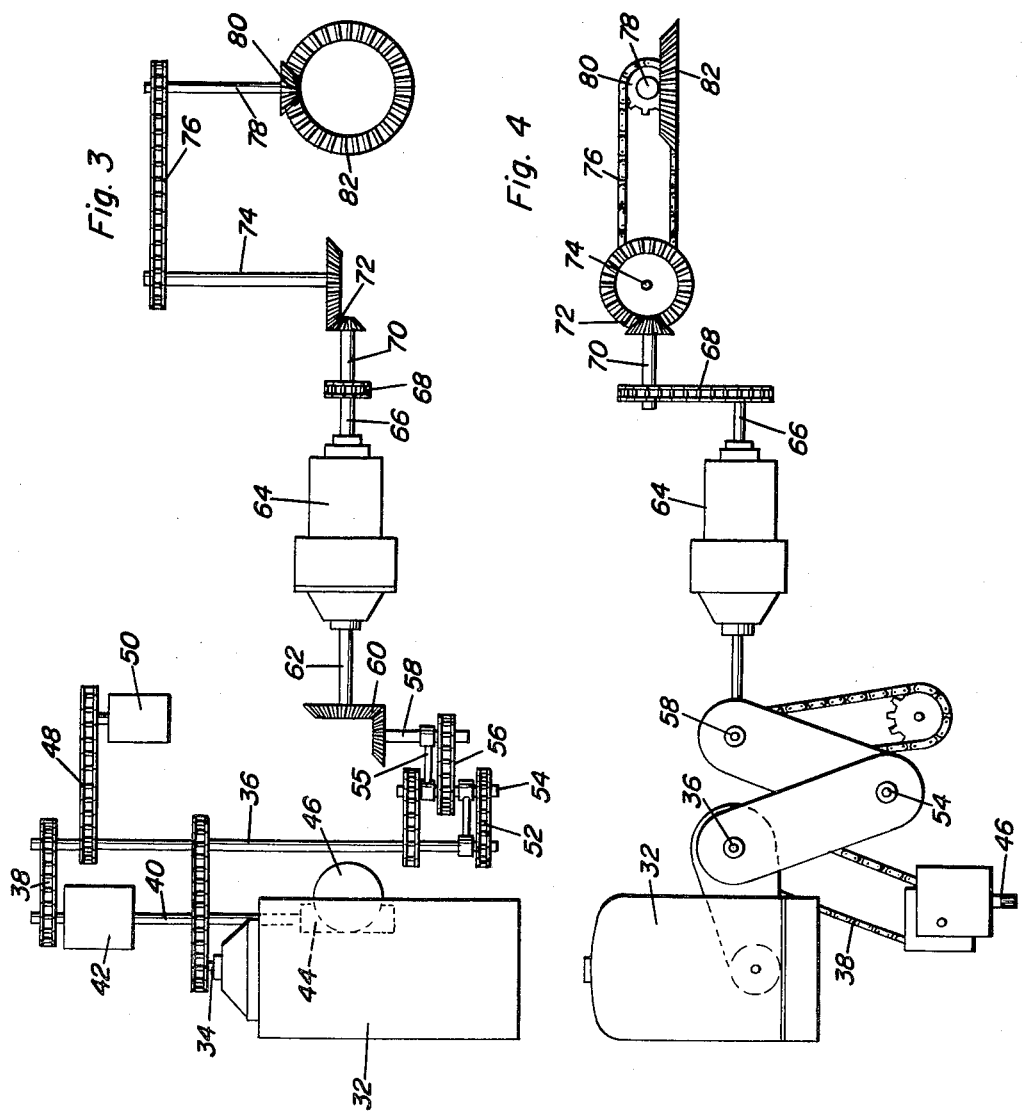

John V. Watson INVENTOR

BY *Clarence A. O'Brien*
and *Harvey B. Jacobson*
Attorneys

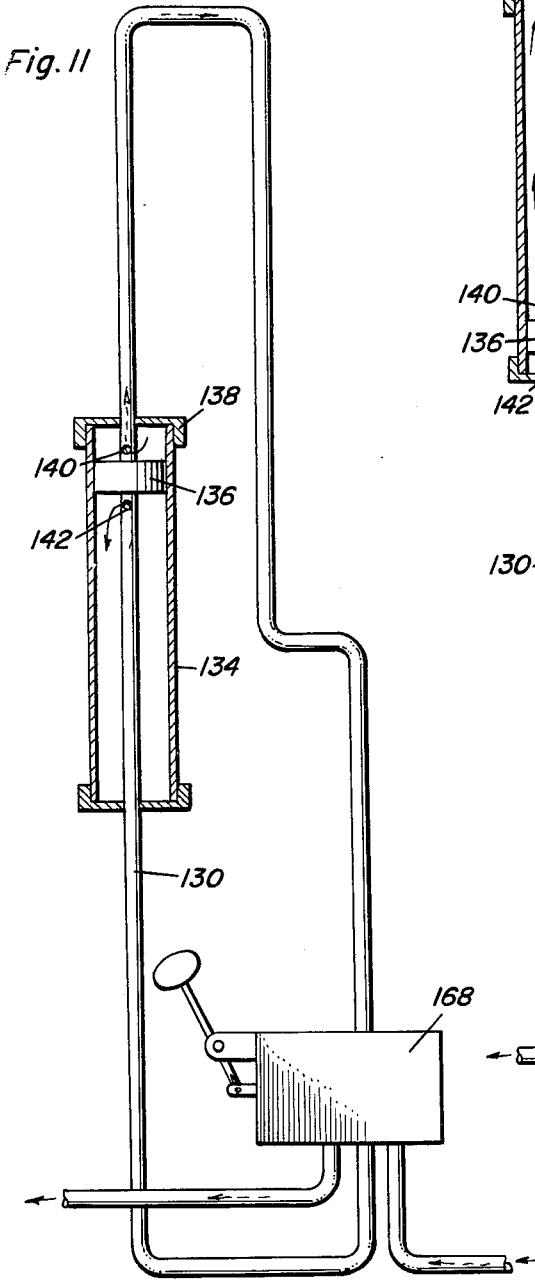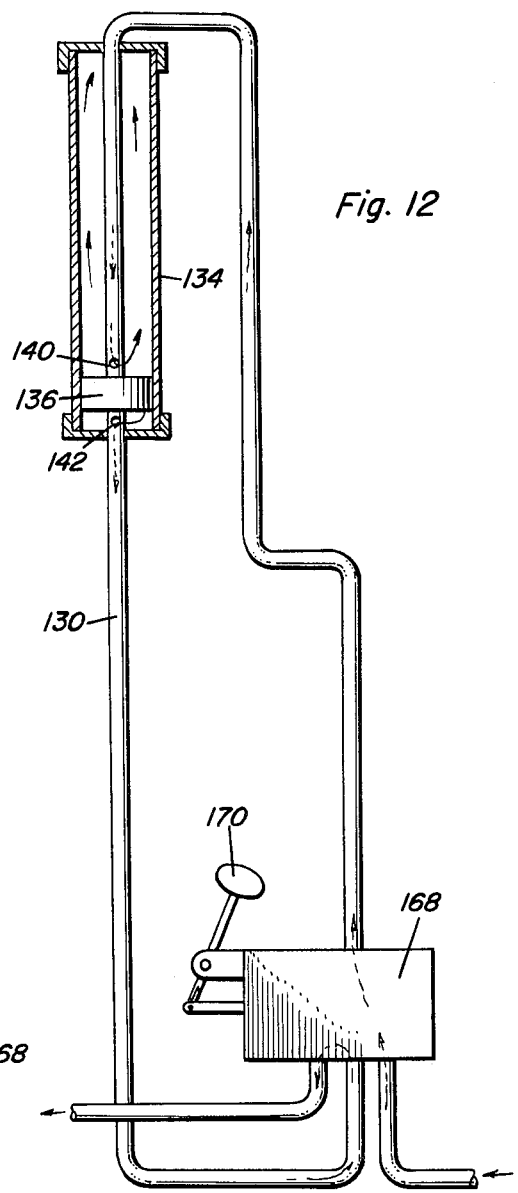

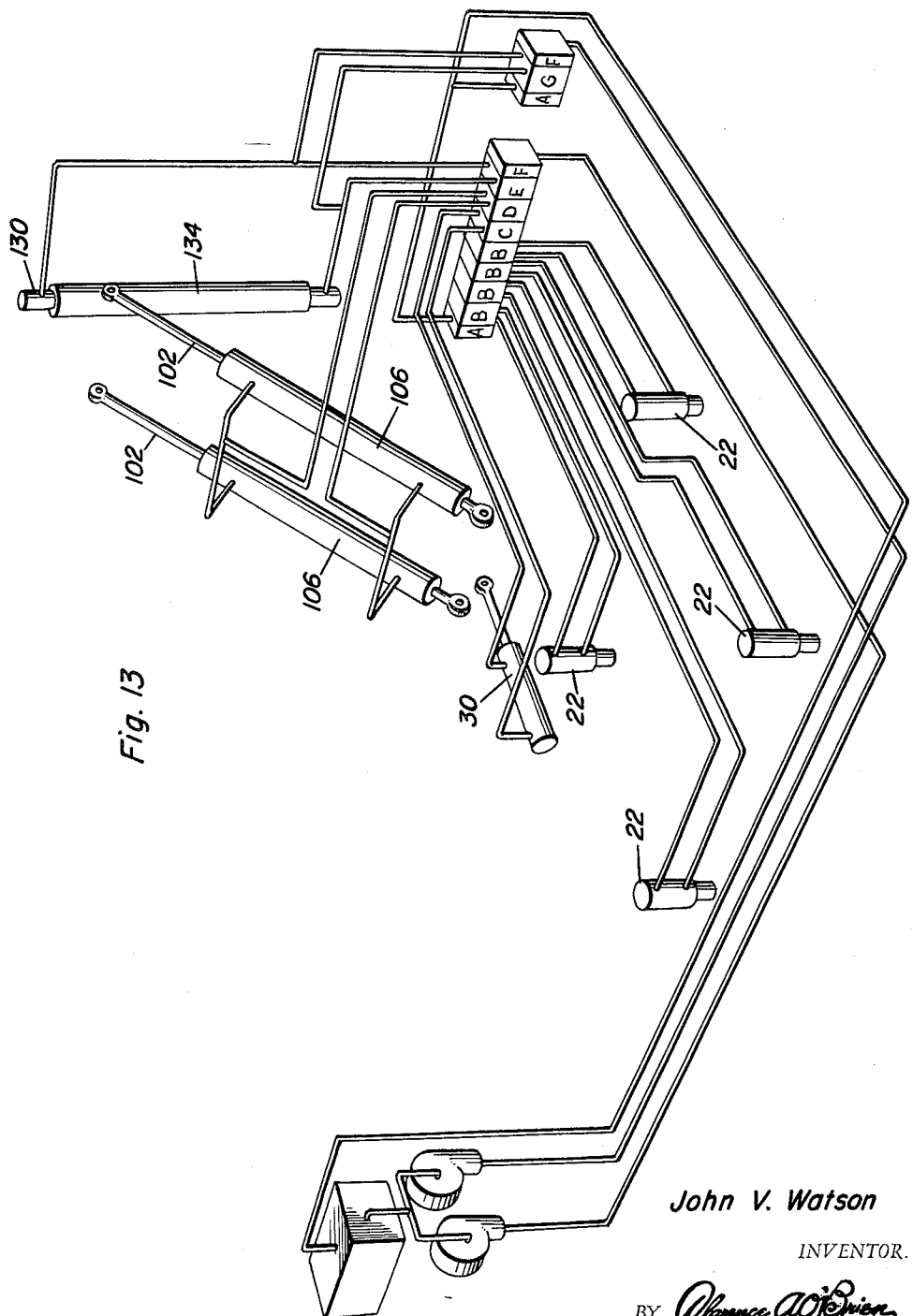

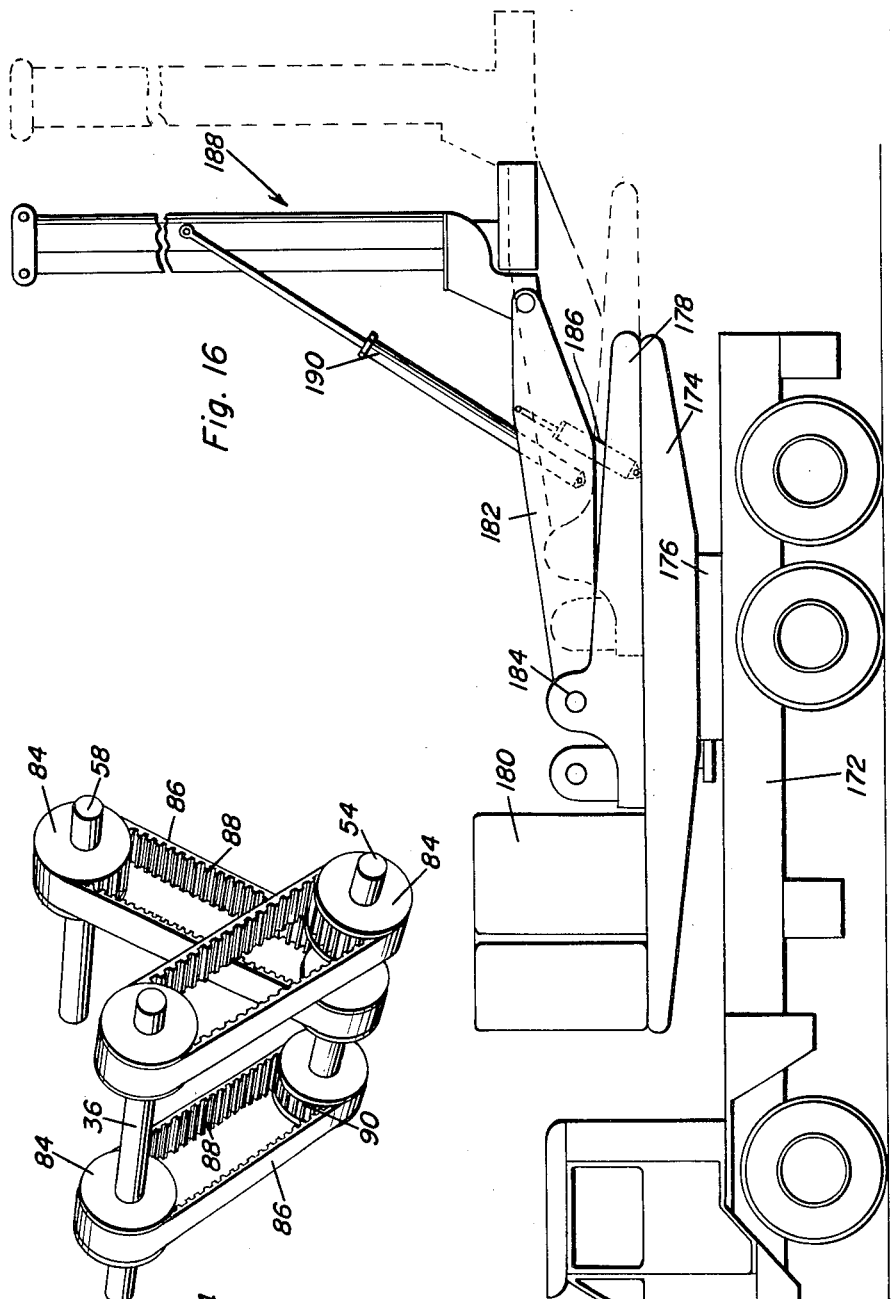

United States Patent Office 3,089,550
Patented May 14, 1963

3,089,550
EXCAVATING OR DRILLING DEVICE
John V. Watson, Fort Worth, Tex., assignor to Watson Foundation Company, Inc., Fort Worth, Tex., a corporation of Texas
Filed May 8, 1959, Ser. No. 812,033
2 Claims. (Cl. 175—165)

The present invention generally relates to an excavating or drilling device and more particularly to a mobile device of this nature which includes generally a collapsible derrick and other structural features enabling optimum use of a rotary drill for excavation purposes.

It has been known previously in this field to provide a derrick construction for supporting a drill bar which is powered by a suitable rotary at the lower end of the derrick and the details of this conventional structure are not shown since it forms no part of the present invention with the present invention limiting itself to the specific structural details of the derrick and the mechanism for downcrowding the drill bar.

The primary object of the present invention is to provide an excavating device incorporating a novel assembly for the drill derrick for downcrowding the drill which combines the use of a hydraulic piston and cylinder arrangement and a cable system.

Still further objects of the present invention will reside in its simplicity of construction, ease of adjustment and orientation of component parts, efficiency in operation and relatively inexpensive maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the excavating device of the present invention minus the drill shaft or rod;

FIGURE 2 is a schematic view illustrating the main frame mounted on a turntable and the sub-frame longitudinally movable thereon;

FIGURE 3 is a schematic plan view of the drive mechanism for the rotary for rotating the drill rod;

FIGURE 4 is a schematic side elevation of the illustration in FIGURE 3;

FIGURE 5 is an enlarged side elevation of the derrick with the central portion thereof omitted;

FIGURE 6 is a front elevational view in schematic illustration showing the construction of the downcrowding mechanism for the drill bar;

FIGURE 7 is a side elevation of the construction of FIGURE 6;

FIGURE 8 is a front elevation of the construction of FIGURE 5;

FIGURE 11 is a diagrammatic view of the downcrowding piston and cylinder arrangement together with a hydraulic control thereof illustrating the position of components as shown in FIGURE 9;

FIGURE 12 is a schematic view similar to FIGURE 11 but with the components shown as in FIGURE 10;

FIGURE 13 is a diagrammatic view of the hydraulic system employed in the present invention;

FIGURE 14 is a perspective view showing the details of the drive extension means;

FIGURE 15 is a detailed plan sectional view taken substantially upon a plane passing along section line 15—15 of FIGURE 1, on an enlarged scale, showing the relationship of components of the derrick; and FIGURE 16 is a side elevation of a modified form of the present invention.

Figure 9:
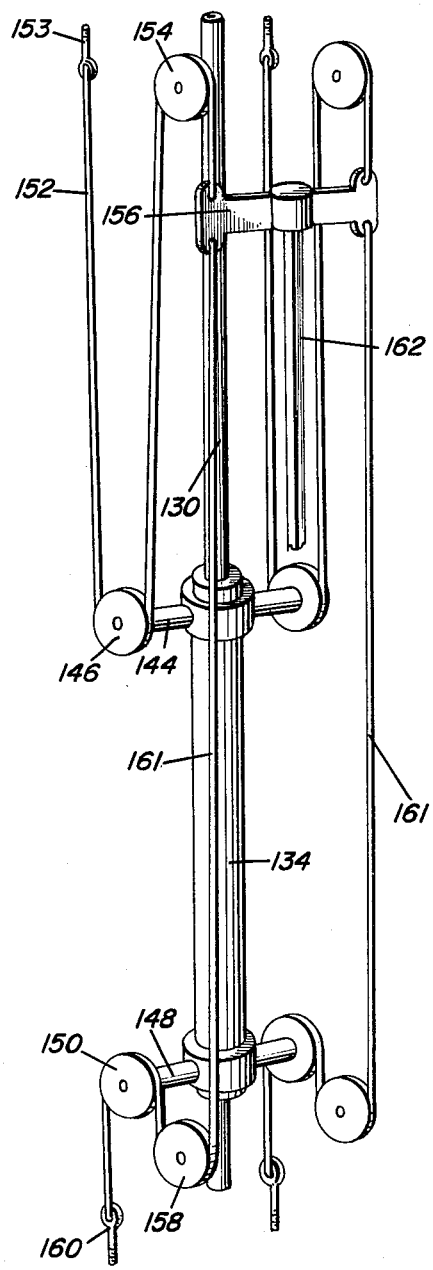
FIGURE 9 is a schematic view of the downcrowding mechanism showing the orientation of components and illustrating the drill bar in elevated position.

Referring now specifically to the drawings, the numeral 10 generally designates the excavating device of the present invention which is mounted on a vehicle generally designated by the numeral 12 which includes the usual longitudinal frame rails 14, a control cab 16, front steerable wheels 18, rear driving wheels 20 and the usual driving and controlling mechanism constituting a self-propelled vehicle. Outrigger jacks or props 22 are provided for supporting the vehicle frame rails 14 to prevent tilting or overturning of the excavation device during operation and also for maintaining the orientation of the excavation device once it has been set up.

The props 22 are preferably hydraulically controlled and are controlled from a central control station. Supported from the frame rails 14 is a turntable 24 rotatably supporting a main frame 26 with the main frame 26 longitudinally adjustably supporting a sub-frame 28 having suitable guiding interconnection with frame 26 and which is moved longitudinally by provision of a suitable hydraulic piston and cylinder arrangement 30 connected between frames 26 and 28 in a suitable manner. The main frame 26 also supports a power source such as an internal combustion engine 32 and the associated equipment for operating the same with the power source 32 having a power output shaft 34 for driving a transverse lay shaft 36. The lay shaft 36 has a power take-off chain or pulley assembly at each end thereof with the chain 38 at one end driving a shaft 40 through a reduction gear box and clutch assembly 42 with the shaft 40 having a worm gear 44 on the end thereof for engagement with a pinion 46 in mesh engagement with the turntable 24 so that the power may be used to turn the main frame about a vertical axis at the center of turntable 24. The shaft 36 also is provided with a drive chain 48 connected with a fluid or hydraulic pump 50 for supplying pressurized fluid to the outrigger jacks 22 and other hydraulic apparatuses described hereinafter.

Adjacent the other end of the lay shaft 36, there is provided a pair of chain drives 52 which extend downwardly and engage sprockets on an idler shaft 54 which in turn drive a chain 56 carried by a power shaft 58 having a gear transfer mechanism 60 connected thereto and driving the input shaft 62 to a fluid coupling and automatic transmission 64 which drives a power output 66 through a drive chain 68, drive shaft shaft 70, bevel gear arrangement 72, shaft 74, drive chain 76 and shaft 78 which has a bevel gear 80 on the end thereof for driving the rotary 82 used for driving the drill bar which rotary and drill bar are conventional.

FIGURE 14 illustrates the actual type of power transfer mechanism used and instead of the chain drive as schematically shown, the shafts 36, 54 and 58 are actually connected by belt pulleys 84 and wide belts 86 provided with a plurality of transverse lugs 88 on the inner surface thereof engaging with transverse grooves 90 on the periphery of the pulleys 84 thereby providing a positive connection. As the distance between the shafts 58 and 36 change, the shaft 54 may raise and lower itself with the center distances between shafts 36 and 54 and between shaft 54 and shaft 58 being held by rods 55 with end bearings connecting the rods to the respective shafts in order to maintain the belts 86 in taut condition thereby providing a positive drive arrangement but one which is capable of longitudinal elongation.

The automatic transmission 64 is important in the drive train in that it permits slippage in the event the drill is prevented from rotating thus eliminating damage to the drills and this type of power transmission will also enable a steady pressure to be exerted on the drill and will provide a gradual build up of pressure rather than a sudden application of torque.

Supported on the sub-frame 28 is a cab 90 for an operator which has the usual access door 92 and windows 94. Alongside of the cab 90, a pair of support arms 96 are provided which include a pivotal connection 98 to a derrick generally designated by the numeral 100. The derrick 100 is supported in vertical position by an elongated piston rod 102 being pivotally attached to the derrick 100 by brackets 104 and being slidably received within a cylinder 106 pivotally attached to the sub-frame 28 whereby the expansion and contraction of the piston and cylinder assembly 102 and 106 will raise and lower the derrick 100 about the pivot pin 98. There are two piston and cylinder assemblies of conventional multiple stage construction 102 and 106 interconnecting the sub-frame and derrick for raising and lowering the derrick from a generally horizontal as forwardly inclined position in overlying relation to the vehicle 12 to a vertical or substantially vertical position as illustrated in FIGURE 1.

The derrick which forms the present invention is illustrated in cross-section in FIGURE 15 and includes vertical tubular members 108 at the forward corners thereof and vertical inwardly facing channel shaped members 110 at the rear corners thereof which are provided with triangular reinforcements 112 on the outer surface thereof and which are interconnected with each other by arcuate transverse brace members 114. The corner vertical rails 108 are interconnected by transverse brace members 116 and the rails 108 and 110 are interconnected by brace members 118. The brace members may be crossed or otherwise attached in such a manner as to provide a rigid derrick and where the bracket 104 is provided, there may be a reinforcement plate 120 and at the lower end of the derrick, solid plate construction 122 is provided and also the rotary 124 is supported on the derrick in any conventional manner and the details of the rotary are not shown.

As illustrated in FIGURES 5 and 8, the derrick 100 is provided with a top assembly 126 and a bottom plate 128. Extending longitudinally between the top and bottom plates is an elongated hollow pipe or rod 130 which is anchored at the upper end by a fastening nut or assembly 132. Slidably disposed on the elongated pipe which forms a piston rod is an elongated cylinder 134 sealed in relation to the pipe and longitudinally slidable thereon. As illustrated in FIGURE 11, the hollow pipe 130 is provided with a piston 136 rigid thereon which is slidably disposed within the cylinder 134 and the cylinder 134 may be provided with removable caps 138. The pipe 130 is also provided with an aperture 140 adjacent the upper surface of the piston and an aperture 142 adjacent the lower surface of the piston 136 whereby fluid pressure may be selectively communicated with opposite sides of piston 136 while venting the alternate side of the piston 136 for causing vertical reciprocation of the cylinder 134 on the pipe 130 as illustrated schematically in FIGURES 11 and 12.

The upper end of the cylinder 134 is provided with a transverse shaft 144 rigid therewith with the outer ends of the shaft 144 having a pulley 146 rotatable thereon. The lower end of the cylinder 134 is provided with a transverse shaft 148 having pulleys 150 on the outer ends thereof.

A cable 152 having an eye bolt 153 at the upper end thereof is anchored to the upper plate 126 and has a depending run which goes under and around the bottom portion of the pulley 146 on one end of the shaft 144 and thence upwardly and over a pulley 154 mounted on and above the top plate 126. The cable 152 then extends downwardly and is anchored to a cross plate 156 containing the kelly swivel. A cable 155 is anchored to the upper kelly swivel 156 and comes down through pulley 147 on a mid-point kelly stabilizer 157 and is then attached to the derrick by a cable fitting 166 and the stabilizer 157 lowers itself by gravity and at one-half the speed of the top kelly swivel. To clarify the mid-point swivel and its services, this particular method of attaching the cable to support this part allows it to move at one-half the rate that the top kelly swivel moves. The mid-point swivel has rollers 164 in FIGURE 6 operating in the same guide as the kelly swivel rollers 165. It has a loose fitting square hole through which the kelly bar passes and is provided with bearings to allow the inner portion to rotate. It will slide down the kelly bar as the kelly swivel end of cable 155 is slacked by downward movement. The fitting 166 in FIGURE 7 is the cable socket attaching one end of the mid-point stabilizer's control cable 155 to the derrick. The other end of this cable is shown attached to the kelly swivel 156 and is labeled 159 in FIGURE 6. Another cable 161 is anchored to upper swivel 156 and comes down past the stabilizing swivel 157 and then under a pulley 158 supported by a fitting 163 on the bottom plate 128. The cable 161 then extends upwardly and over the pulley 150 on the lower shaft 148 and the other terminal end is anchored by eye bolt 160 secured to the bottom plate 128. At the other side of the assembly, a similar pulley and cable arrangement is used whereby upward vertical movement of the cylinder 134 will cause downward movement of the upper kelly swivel 156. The swivel 156 is provided with a rotatable depending drill shaft or kelly bar 162 which extends through the rotary and which is rotated thereby and which carries the drill for drilling or excavating. The top kelly swivel 156 is also provided with rollers 165 similar to rollers 164 for engagement with the inwardly facing channel shaped tracks 110 for guiding movement of the swivel 156.

Figure 10:
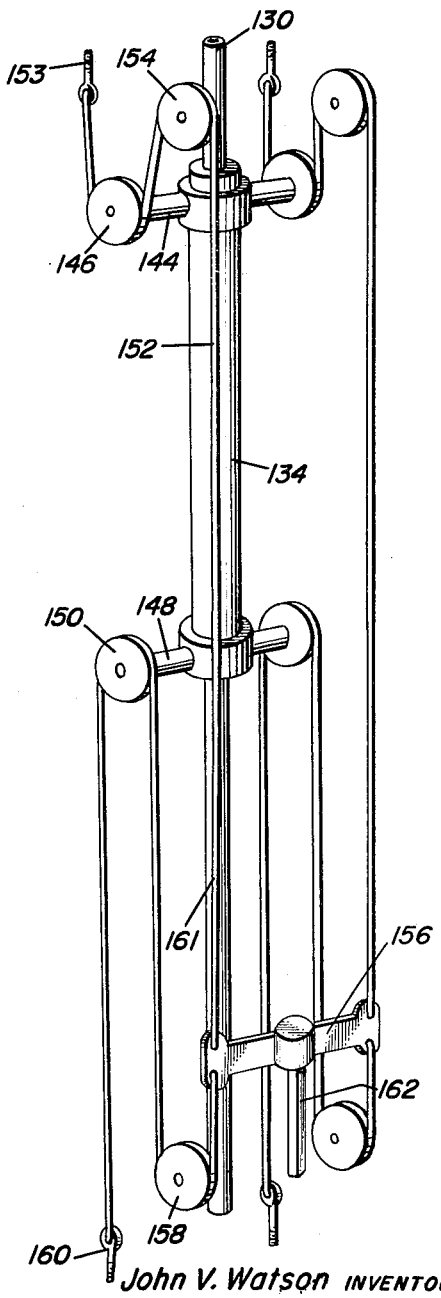
FIGURE 10 is a schematic perspective view similar to FIGURE 9 illustrating the structural components with the drill bar in lower position.

As illustrated in FIGURES 11 and 12, the pipe 130 is provided with a control valve 168 of conventional construction having a control handle 170 which will either supply pressurized fluid to the cylinder through aperture 142 and exhaust the portion of the cylinder above piston 136 through aperture 140 as illustrated in FIGURE 11 or will exhaust below the piston 136 and let pressurized fluid into the cylinder above piston 136 at which time the cylinder 134 will move upwardly in the position illustrated in FIGURE 12 and will move the drill bar downwardly as illustrated in FIGURE 10.

FIGURE 13 illustrates schematically the hydraulic system layout including the various conduits and control valves designated by the alphabetical letters together with the schematic orientation of the various hydraulic piston and cylinder arrangements together with the pump or pumps and the reservoir tank. FIGURES 9 and 10 illustrate the two extreme positions of the movable cylinder 134 and FIGURES 11 and 12 illustrate the corresponding positions schematically while FIGURES 5–8 illustrate the structure of the derrick and the piston and cylinder arrangements and guide plate removed therefrom.

In operation of the device, the mobile vehicle is driven over the road with the derrick in collapsed horizontal position generally overlying the vehicle and, of course, with the drill string removed therefrom. When the vehicle reaches the desired location, the hydraulic jacks 22 are extended to level the vehicle and provide proper rigid support. The jacks are extended by proper manipulation of hydraulic control valves for pressurizing the jacks since the hydraulic pumps provide sufficient hydraulic pressure for this purpose.

The hydraulic piston and cylinder assemblies 102 and 106 are then extended for elevating the derrick to a vertical position about the trunnions which support the same from the frame. This also is accomplished by manipulating a proper hydraulic control all of which may be disposed in the operator's cab.

After the derrick is elevated, the turntable may be powered for swinging the derrick arcuately and perhaps to a lateral relation to the vehicle and the sub-frame may be extended also by hydraulic fluid pressure for moving the derrick and drill bar longitudinally in relation to the frame thereby providing for proper orientation of the derrick in relation to the area to be drilled.

After the derrick has been positioned by the preceding procedure, the drill bits or elements may be attached to the drill bar and the drill bar may be caused to rotate through the coventional rotary at the lower end of the derrick. For moving the drill stem or shaft vertically, suitable hydraulic control valves are provided. If elevating of the drill is desired, then the valve is moved to admit fluid pressure into the lower end of the hollow pipe 130 which is closed at the longitudinal center thereof whereby pressurized fluid will be exhausted into the cylinder 134 below the piston 136. In this position, the valve will also exhaust from the apertures 140 above piston 136 thus evacuating the cylinder 134 above the piston 136 thus causing the cylinder 134 to move downwardly thereby elevating the drill bar and the drill.

For downcrowding the drill and drill bar, the valve handle 170 and the valve 168 is moved to a position for admitting pressurized fluid into the top end of the tubular pipe 130 thus admitting fluid through apertures 140 against the top of the piston 136 thereby forcing the cylinder 134 upwardly. At the same time the lower end of the pipe 130 has been communicated with the reserve tank which exhausts the fluid from this portion of the cylinder 134 through apertures 142 thereby assisting in movement of the cylinder 134 upwardly which causes corresponding downward movement of the slide plate and drill bar thereby downcrowding the drill.

In FIGURE 16 of the drawings, a modified form of the present invention is illustrated which does not employ a cab but which includes the vehicle generally designated by the numeral 172 which is the same as in the preceding form of the invention with there also being provided a frame 174, a turntable 176 and a sub-frame 178 longitudinally movable on the frame together with a power source 180 and an equivalent drive mechanism. Pivotally supported from the sub-frame 178 adjacent the rear end thereof is a pair of arms 182 pivotal about trunnions 184 and being raised and lowered by a hydraulic piston and cylinder arrangement 186. The outer ends of the arm 182 support a derrick generally designated by the numeral 188 which is supported in vertical position by a hydraulic piston and cylinder arrangement 190 extending from the arms 182 to the derrick 188. The derrick 188 thus may be moved longitudinally with the sub-frame 178 and also tilted to a horizontal or vertical position. Thus, the derrick 188 of the form illustrated in FIGURE 16 is not only capable of revolving about the center of rotation of the turntable but also capable of longitudinal or lateral movement in relation to the vehicle 172 and also changes in elevation by virtue of raising and lowering of the arms 182 by the piston and cylinder arrangement 186 thereby further providing a more utilitarian excavating device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a drilling device for drilling holes downwardly in the earth, a vertically disposed derrick, a vertical trackway mounted in the derrick, a plate vertically movably mounted on the trackway, a drill bar extending vertically downwardly from said plate, means interconnecting the plate and drill bar for permitting rotation of the drill bar in relation to the plate and preventing longitudinal movement of the drill bar in relation to the plate, means on the lower end of the derrick drivingly engaging the drill bar during vertical movement thereof, and means interconnecting the derrick and said plate for reciprocating the plate and drill bar in relation to the derrick, said last named means including hydraulic and mechanical cable means for multiplying the movement of the hydraulic means for reciprocating the plate a relatively long distance in relation to the distance of expansion and contraction of the hydraulic means, said hydraulic and cable means including a vertically elongated stationary hollow rod mounted in the derrick, said rod having a piston fixed thereon adjacent the center thereof, a cylinder slidably movably mounted on said rod and encompassing said piston, an aperture in said hollow rod on each side of the piston for admitting fluid under pressure into either side of the cylinder while exhausting fluid from the opposite side of the cylinder for moving the cylinder vertically on the rod, said cable means including a cable connected to the derrick, a pulley on the cylinder under which the cable is entrained, a pulley stationarily mounted on the derrick over which the cable is retained, the other end of the cable being connected to the plate whereby the movement of the plate will be multiplied with respect to the movement of the cylinder.

2. The structure as defined in claim 1 wherein a central stabilizer is provided for the drill bar, said stabilizer being slidably mounted in the trackway, a cable attached to the plate and extending downwardly towards the stabilizer, a pulley on the stabilizer under which the cable extending downwardly from the plate is entrained, said last mentioned cable being anchored to the derrick above the central stabilizer whereby downward movement of the plate will cause downward movement of the stabilizer a distance of one-half of the movement of the plate.

UNITED STATES PATENTS

References Cited in the file of this patent

| | | |
|---|---|---|
| 1,641,926 | Genung | Sept. 6, 1927 |
| 1,783,914 | Davidson | Dec. 2, 1930 |
| 1,844,873 | Smith | Feb. 9, 1932 |
| 2,657,906 | Richards | Nov. 3, 1953 |
| 2,812,665 | Shelor et al. | Nov. 12, 1957 |
| 2,820,611 | Fuehrer | Jan. 21, 1958 |
| 2,832,567 | Fletcher et al. | Apr. 29, 1958 |
| 2,849,212 | Robbins | Aug. 22, 1958 |
| 2,856,155 | Putt | Oct. 14, 1958 |
| 2,868,019 | Bull | Jan. 13, 1959 |
| 2,913,226 | Pritchard | Nov. 17, 1959 |
| 2,953,930 | Meyer | Sept. 27, 1960 |